United States Patent [19]

Mullican et al.

[11] Patent Number: 5,887,880

[45] Date of Patent: Mar. 30, 1999

[54] SQUATDOWN AXLE AND SUSPENSION SYSTEM

[75] Inventors: Vernon T. Mullican; Joe Donald Green; Vernon J. Mullican, all of Anadarko, Okla.

[73] Assignee: Anadarko Bank & Trust Company, Anadarko, Okla.

[21] Appl. No.: 651,361

[22] Filed: May 22, 1996

[51] Int. Cl.⁶ .............................. B60G 3/14; B60G 11/27
[52] U.S. Cl. ..................................... 280/43.18; 280/43.23; 280/789; 280/124.116; 280/124.128; 280/124.16; 414/476; 414/494; 414/506
[58] Field of Search .............................. 280/43.18, 43.23, 280/43.17, 43.11, 43.24, 414.5, 704, 713, 711, 698, 788, 789, 661, 690, 124.116, 124.128, 124.157, 124.16; 180/24.02, 906; 414/476, 474, 484, 485, 483, 482, 494, 506, 559, 500

[56] References Cited

U.S. PATENT DOCUMENTS

| | | | |
|---|---|---|---|
| 2,151,633 | 3/1939 | Black | 280/788 |
| 2,957,593 | 10/1960 | Evans | 280/43.23 |
| 3,633,775 | 1/1972 | Pugliese | 280/43.23 |
| 3,866,935 | 2/1975 | Nelson | 280/43.23 |
| 4,260,315 | 4/1981 | Bouffard | 280/43.23 |
| 4,946,333 | 8/1990 | Boatwright | 414/494 |

FOREIGN PATENT DOCUMENTS

| | | | |
|---|---|---|---|
| 464412 | 1/1992 | European Pat. Off. | 280/713 |
| 93/11953 | 6/1993 | WIPO | 280/711 |

*Primary Examiner*—Peter C. English
*Attorney, Agent, or Firm*—Head, Johnson & Kachigian

[57] ABSTRACT

A squatdown axle and suspension system for vehicles used to haul cargo provides a frame, a cargo bed attached to the frame, at least two wheels, and an adjustable suspension system for suspending the frame on the wheels between a transport position in which the frame and cargo bed are generally parallel to the road surface and a load position in which the cargo bed is lowered to the road surface. In one embodiment the suspension system includes at least one air bag which can be alternately inflated or deflated to adjust the position of the cargo bed and frame with respect to the road surface. A removable pulley for use with a winch and cable and an adjustable axle assembly are also provided.

8 Claims, 7 Drawing Sheets

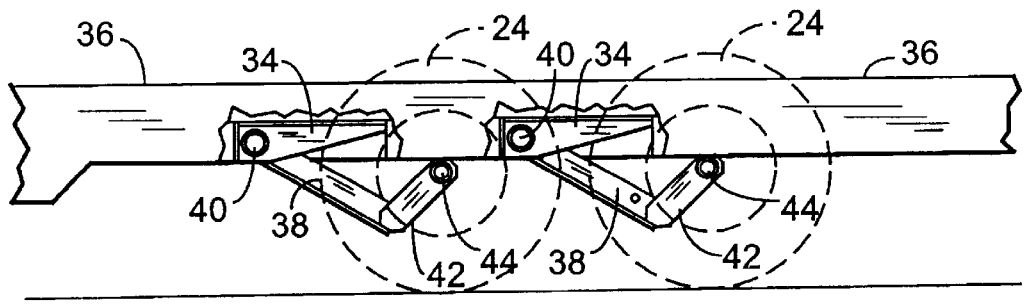
FIG. 3
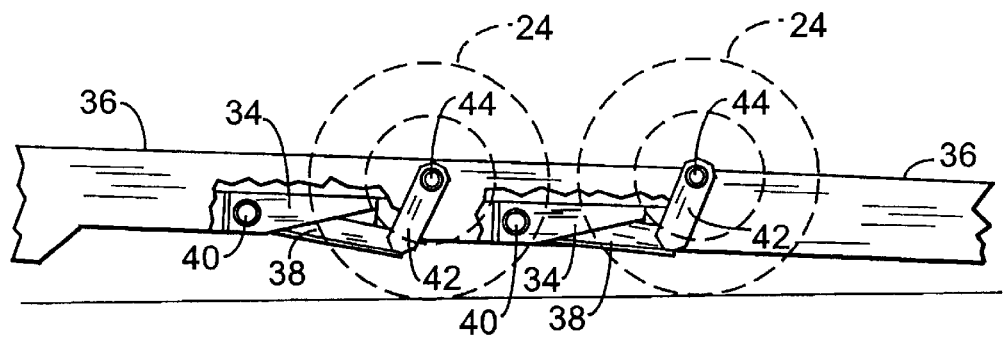
FIG. 4
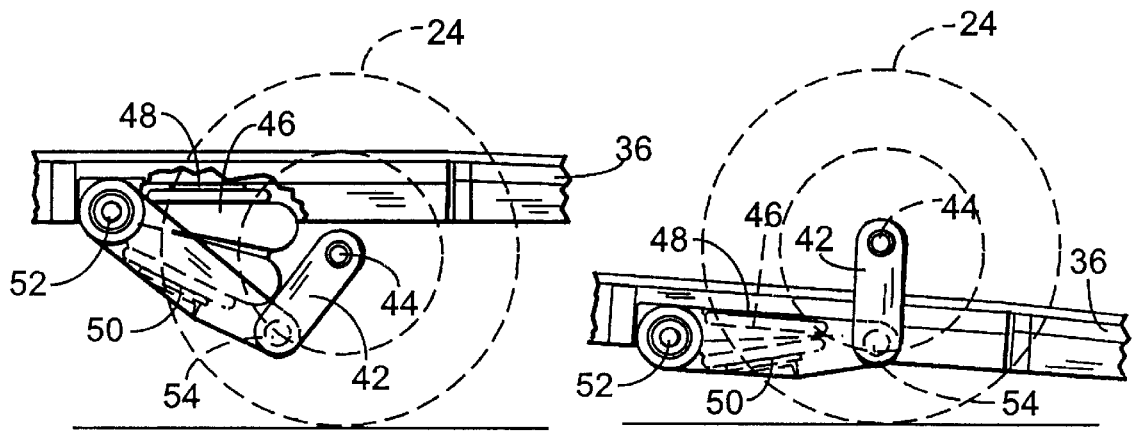
FIG. 5          FIG. 6

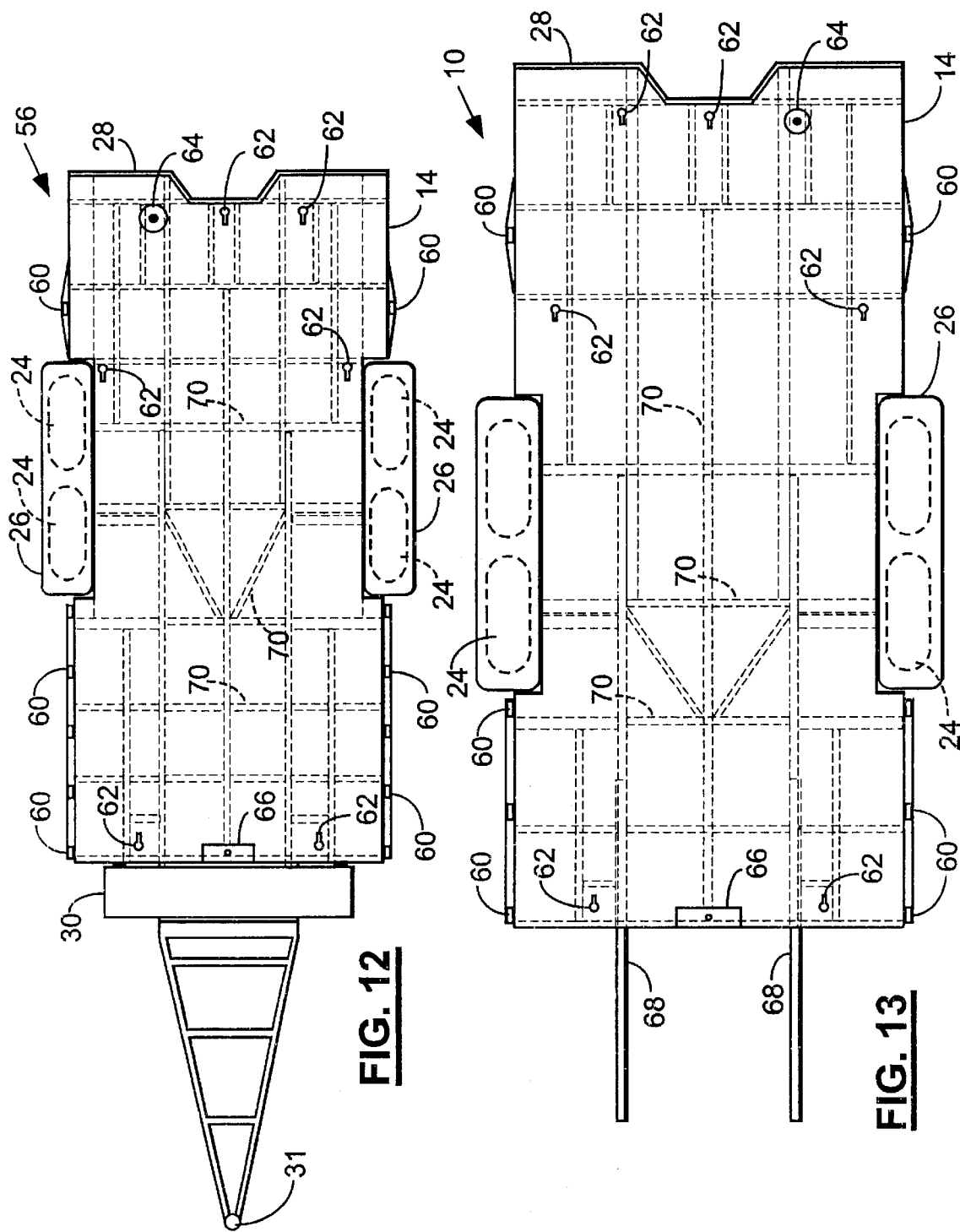

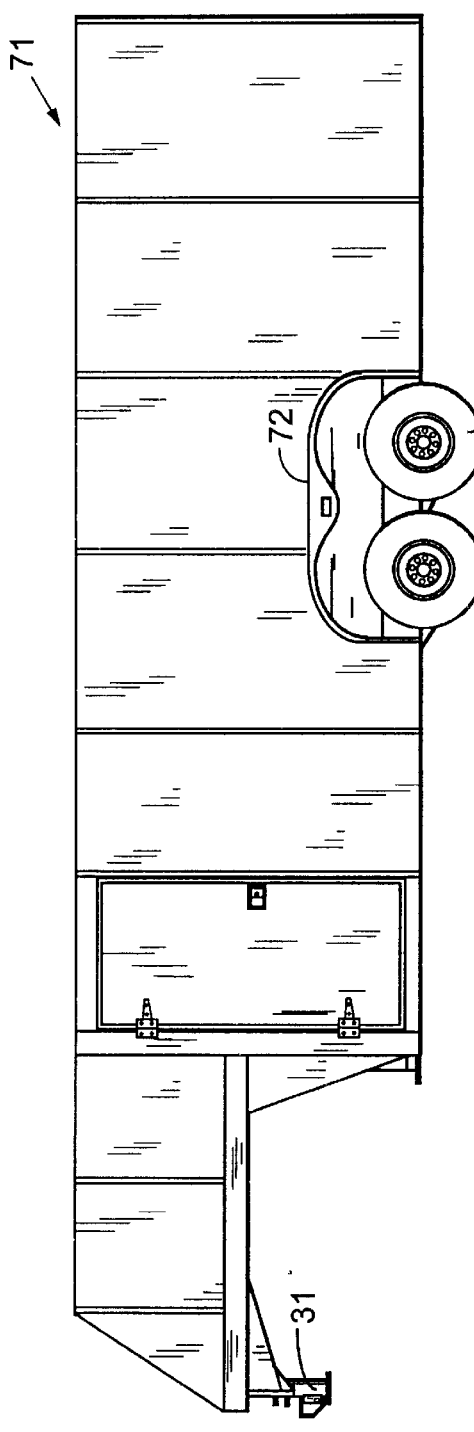
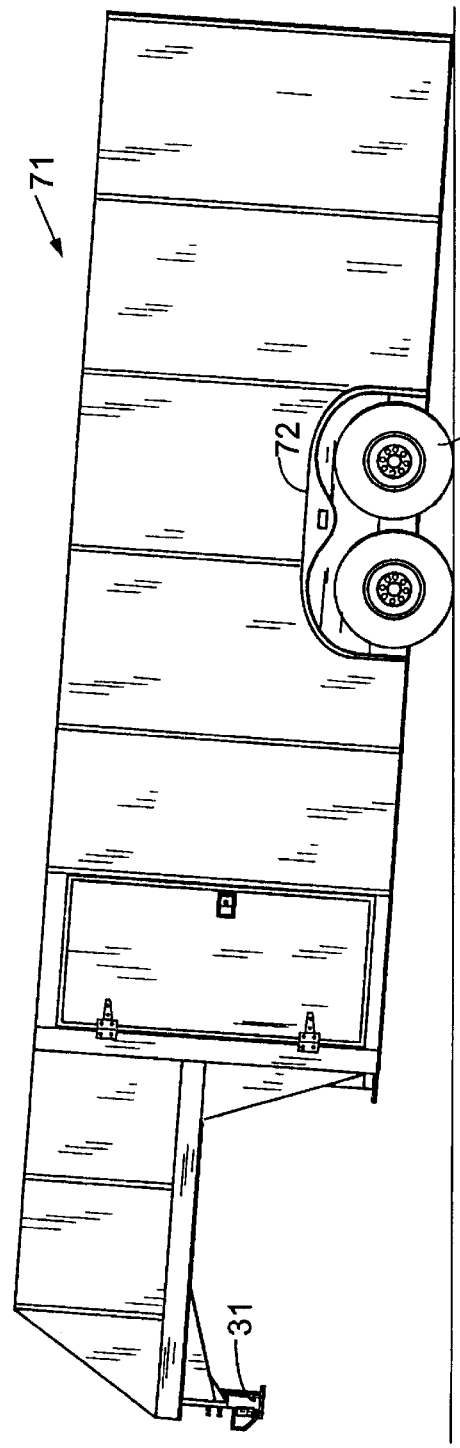

SQUATDOWN AXLE AND SUSPENSION SYSTEM

BACKGROUND OF THE INVENTION

1. Field of the Invention

This invention relates generally to the field of suspension systems, and more particularly, but not by way of limitation, to a squatdown axle and suspension system for vehicles used to haul cargo. The squatdown suspension system includes an adjustable squatdown axle so that the cargo bed can be lowered to the loading surface to achieve a load angle of as little as 3 degrees.

2. Discussion

In the past, tow trucks utilized tow bars, dollies, or slings to tow vehicles from one location to another. The tow truck of the past has been replaced by a truck capable of hauling the vehicle instead of towing the vehicle. The improved design, referred to herein as a rollback design, includes a cargo bed which rolls back on a frame from a transport position to a load position. In the load position, the rear of the cargo bed is lowered to the road surface while the front of the cargo bed remains elevated. The rollback design includes a winch (with cable) attached to the front of the frame. The cable is attached to the vehicle which is to be hauled, the winch pulls the vehicle into position on the cargo bed, and the vehicle and rollback cargo bed are then pulled forward to a level hauling position. Tie downs, chains, and the like are used to secure the transported vehicle to the cargo bed.

The rollback design discussed above, while an improvement over prior tow truck designs, includes several limitations. Rolling the cargo bed back to permit loading of a vehicle extends the overall length of the truck plus cargo bed so that some locations are inaccessible. Hauled vehicles having a low suspension, frame, or body are susceptible to damage from the cable due to the angle formed between the cargo bed and the loading surface when the cargo bed is in the load position. In the transport position, the cargo bed is typically a minimum of forty to forty-eight inches above the road surface, thus producing a high center of gravity during transport.

Conventional rental trucks and trailers used to haul household goods likewise require a raised dock or a ramp to permit loading of heavy items. U-Haul rental trucks, for example, are normally equipped with a slide-out ramp. Refrigerators, washers, dryers, and the like are typically loaded onto a hand truck, and the hand truck is pushed from the loading surface, up the ramp, into the cargo area of the rental truck. The slide-out ramp, like the rollback cargo bed, imposes space restrictions on the loading process. The process of moving heavy objects up the ramp introduces a risk of injury both to the items being moved and to personnel responsible for loading the heavy objects.

Some rental trucks, freight delivery trucks, and trailers are equipped with power lifts designed to lift heavy objects from the loading surface to the level of the cargo area. While the power lifts eliminate the need for moving personnel to push heavy objects up a ramp, the small size of the power lift creates additional safety concerns when personnel attempt to move heavy objects from the power lift into the cargo area.

Conventional livestock trailers used to haul horses, cattle, swine, and sheep face similar limitations. Livestock trailers may include a back door which can be lowered to form a loading ramp. The presence of livestock on the loading ramp can cause the trailer to become unstable during loading. With or without a loading ramp, the risk of injury to livestock and wranglers is greatest during loading operations. Trailers which are not equipped with loading ramps carry an increased risk of injury.

Available trucks and trailers for hauling cargo do not provide a suspension which permits the cargo bed to drop to the ground to permit loading of cargo, including automobiles, furniture, and other heavy objects, without use of ramps or docks.

SUMMARY OF THE INVENTION

The present invention provides an axle (referred to herein as a squatdown axle) and a suspension (referred to herein as a squatdown suspension) for trucks and trailers used to haul cargo. The squatdown axle and suspension permit the cargo bed to be lowered to create a load angle of as little as three degrees with respect to the loading surface so that loading ramps and loading docks are not required. The axle and suspension are adaptable to front-wheel-drive trucks, gooseneck trailers, and tag-along trailers. As referred to herein, the term squatdown axle means an adjustable axle which permits a cargo bed to be lowered to the loading surface. The term squatdown suspension means a suspension consisting of one or more squatdown axles.

Broadly speaking, the squatdown suspension provides a cargo bed which is attached to wheels by a squatdown axle. In a preferred embodiment, the squatdown axle includes a set of air bags of the type found in semi trailers. One air bag is attached to each wheel or, in an alternate embodiment, to each end of a single axle. When the air bags are inflated, the cargo bed is deployed in a transport position generally parallel to the road surface (also referred to herein as the loading surface). By reducing the air pressure in the air bags, the cargo bed drops so that the rear lip of the cargo bed rests upon the loading surface. In one embodiment, an on-board air compressor and an air storage tank provide sufficient pressurized air to operate the suspension system through several load-transport cycles without starting the on-board air compressor. Each air bag is supplied by a separate air line, and isolation valves on each bag insure that, once the air bag is inflated, the pressure in the air bag is independent of the pressure on the air line, the compressor, or the air storage tank.

An object of the present invention is to provide an axle and suspension which permit trucks and trailers used for hauling cargo to lower the cargo bed to the loading surface and eliminate the need for loading ramps and similar loading aids.

Another object of the present invention is to provide a suspension which permits trucks and trailers used for hauling cargo to lower the cargo bed to the loading surface to achieve a loading angle of no more than three degrees.

Yet another object of the present invention is to provide a suspension having a relatively low center of gravity and a ride height of 18–20 inches as measured from the road surface to the cargo bed.

Yet another object of the present invention is to provide a suspension system which includes an on-board air compressor, air storage tank, and safety system which prevents the cargo bed from dropping to the ground accidentally.

Yet another object of the present invention is to provide a suspension system which requires a continuous affirmative act by an operator to increase or decrease the pressure in the air bags.

Yet another object of the present invention, while including the previously stated objects of the invention, is to provide a suspension system which is adaptable to gooseneck trailers.

Yet another object of the present invention, while including the previously stated objects of the invention, is to provide a suspension system which is adaptable to tag-along trailers.

Yet another object of the present invention, while including the previously stated objects of the invention, is to provide a suspension system which includes hydraulic brakes for trailers rather than electric brakes commonly found in gooseneck and tagalong trailers.

Yet another object of the present invention, while including the previously stated objects of the invention, is to provide an air-ride suspension system which results in improved handling and transportation of automobiles and other cargo.

Yet another object of the present invention, while including the previously stated objects of the invention, is to provide a safer configuration for winch and cable as compared to conventional rollback design automobile haulers.

Yet another object of the present invention, while including the previously stated objects of the invention, is to provide an automobile carrier having tandem wheels for improved stability and braking.

Yet another object of the present invention, while including the previously stated objects of the invention, is to provide an improved automobile carrier having reduced maintenance requirements.

Other objects, features, and advantages of the present invention will become clear from the following description of the preferred embodiment when read in conjunction with the accompanying drawings and appended claims.

BRIEF DESCRIPTION OF THE DRAWINGS

FIG. 3 is a partial cutaway detailed view of a first embodiment of the suspension system of the present invention showing the suspension in the transport position.

FIG. 4 is a partial cutaway detailed view of the suspension system depicted in FIG. 3 showing the suspension in the load position.

FIG. 5 is a partial cutaway view of a second embodiment of the suspension system of the present invention showing the suspension in the transport position.

FIG. 6 is a partial cutaway detailed view of the suspension system depicted in FIG. 5 showing the suspension in the load position.

FIG. 12 is a plan view of the cargo bed of the goose-neck trailer depicted in FIGS. 10 and 11.

FIG. 13 is a plan view of the cargo bed of the automobile carrier depicted in FIGS. 1 and 2.

FIG. 14 is a pictorial view of a livestock trailer embodiment of the present invention in a transport position.

FIG. 15 is a pictorial view of the livestock trailer depicted in FIG. 14 in a load position.

DETAILED DESCRIPTION OF THE INVENTION

In the following description of the of the present invention, like numerals and characters designate like elements throughout the figures of the drawings.

Figure 1:
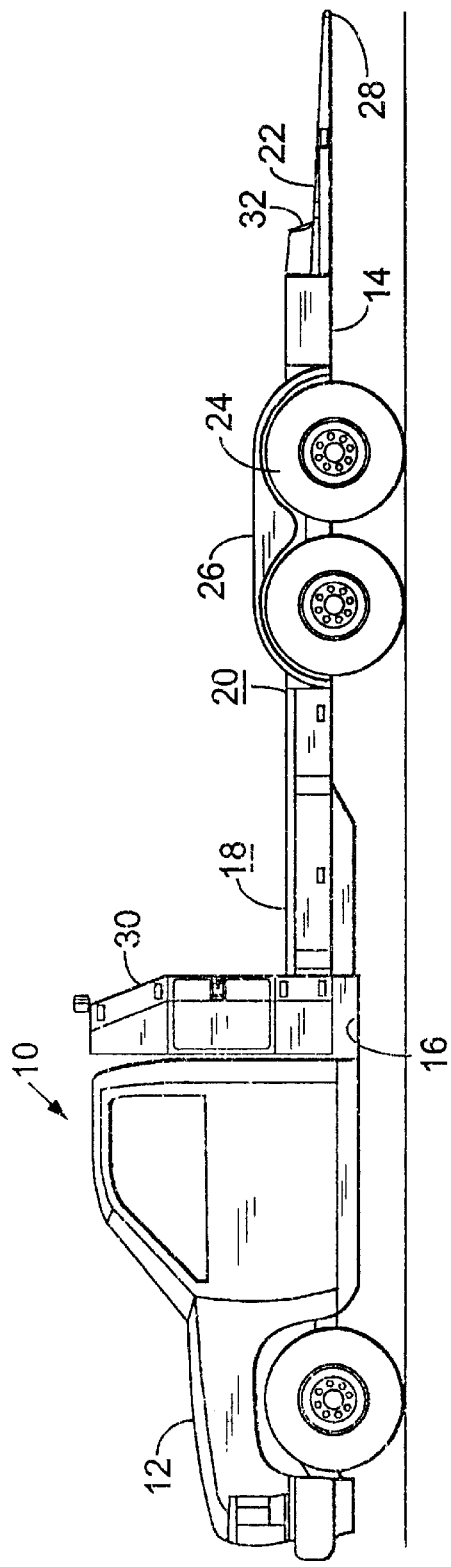
FIG. 1 is a pictorial view of an automobile carrier in accordance with the present invention showing the automobile carrier in a transport position.

Referring generally to the drawings and more particularly to FIG. 1, an automobile carrier 10 according to the present invention is shown in a position referred to herein as the transport position. A front wheel drive truck 12 is attached to a cargo bed 14. A portion of the truck chassis 16 is secured to longitudinal members 70 of the cargo bed's frame (see FIG. 13 for details of frame). The cargo bed 14 includes a front deck portion 18, an intermediate deck portion 20, and a tail deck portion 22. Wheels 24 (two of four shown) are positioned in-line along the intermediate deck portion 20 of the cargo bed 14. Fenders 26 (only one shown) cover the wheels 24 in compliance with state and federal laws. A lip 28 of the tail deck portion 22 of the cargo bed 14 indicates the cargo bed 14 is tapered through the tail deck portion 22. A storage cabinet 30 mounted at the forward-most portion of the cargo bed 14 is used to store an air compressor (not shown) and controls for a pneumatic system (see FIG. 19).

Figure 2:
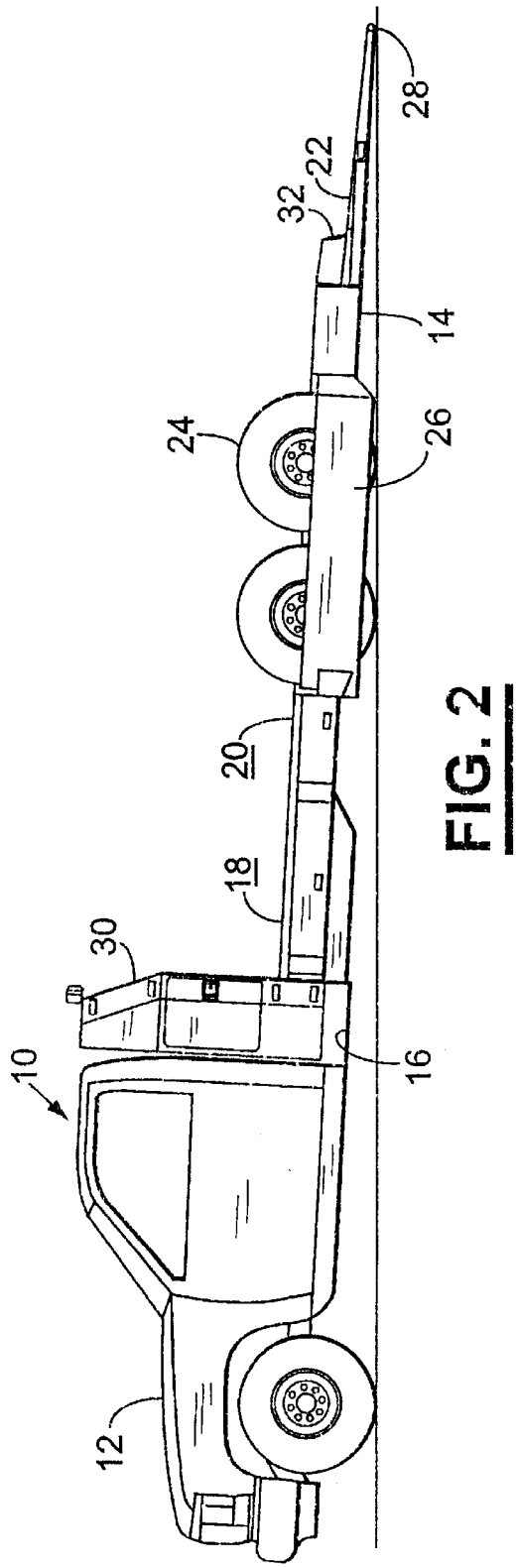
FIG. 2 is a pictorial view of the automobile carrier of FIG. 1 showing the automobile carrier in a load position.

Referring now to FIG. 2, the first embodiment 10 is depicted in a position for loading cargo (referred to herein as the load position). The fenders 26 (only one shown) have been rocked outwardly on fender pins (not shown), and the lip 28 of the tail deck portion 22 of the cargo bed 14 is shown in contact with the road surface. Note that the cargo bed 14 has moved downward with respect to the wheels 24. The wheels 24 can also be described as having moved upwardly relative to the cargo bed 14 although, in fact, the absolute elevation of the wheels 24 has not changed. Tail lights 32 and a reflector (not shown) on the rear-looking face of the lip 28 are included to comply with motor vehicle requirements.

The fenders 26, as depicted in FIGS. 1 and 2, rock outwardly on fender pins. If the fenders 26 are not moved, the wheels 24 would come into contact with the fenders 26 when the cargo bed 14 is moved from the transport position (FIG. 1) to the load position (FIG. 2). According to the present invention, the fenders 26 could be mounted on vertical rods so that, when the cargo bed 14 is moved from the transport position to the load position, the fenders would slide upwardly on the vertical rods. In yet another embodiment, the fenders 26 can be positioned at sufficient height above the wheels 24 to permit the fenders 26 to clear the wheels 24 when the cargo bed 14 is in the load position.

In the presently preferred embodiment, the fenders 26 are equipped with limit switches (not shown) which are closed only when the fenders 26 have been rocked outwardly as indicated in FIG. 2. The cargo bed 14 can not be lowered to the load position unless the limit switches are closed, thereby preventing damage to the fenders 26.

Referring now to FIGS. 3 and 4, shown therein is a detail of an embodiment of the suspension system of the present invention in the transport position (FIG. 3) and in the load position (FIG. 4). An upper pancake plate 34 is attached to a longitudinal frame member 36 along the outside of the intermediate deck portion 20 of the cargo bed 14. A lower pancake plate 38 is pivotally attached to the upper pancake plate 34 by a hinge 40. A swing arm 42, rigidly attached to the lower pancake plate 38, supports a spindle 44 on which the wheel 24 is mounted. An air bag (not shown) is deployed between the upper pancake plate 34 and the lower pancake plate 38. As air pressure within the air bag is controlled from a relatively high pressure to a relatively low pressure, the lower pancake plate 38 pivots on the hinge 40 and moves toward the upper pancake plate 34. The spindle 44 rocks upwardly relative to the frame 36, and the cargo bed 14 moves downwardly relative to the wheels 24.

In FIGS. 3 and 4, two suspension and wheel assemblies are positioned in-line along the intermediate deck portion 20 of the cargo bed 14. Two additional suspension and wheel assemblies (not shown) are required along the intermediate deck portion 20 on the opposite side of the cargo bed 14.

Although a tandem configuration (i.e., four wheels) is depicted in FIGS. 1–4, it will be understood by one skilled in the art that the selection of four wheels enables heavier loads to be transported on the cargo bed 14. For applications involving relatively lighter loads, a single suspension and wheel assembly on each side of the cargo bed 14 is sufficient. For applications involving relatively heavier loads, an additional suspension and wheel assembly can be deployed on each side of the cargo bed 14.

In operation, the air bag (not shown) deployed between the upper pancake plate 34 and the lower pancake plate 38 is inflated to force the upper pancake plate 34 to move away from the lower pancake plate 38. As air pressure in the air bag is increased, the upper pancake plate 34 and the lower pancake plate 38 move progressively from a relatively closed position (FIG. 4) to a relatively open position (FIG. 3). Limit straps (not shown) prevent the cargo bed 14 from moving beyond the transport position in which the cargo bed 14 is parallel to the road surface. When air pressure in the air bag is decreased, the upper pancake plate 34 moves toward the lower pancake plate 38 until the lip 28 of the tail deck portion 22 of the cargo bed 14 contacts the road surface to permit loading of cargo. In the embodiment depicted in FIGS. 3 and 4, each wheel 24 is independently suspended by means of an assembly which includes the upper pancake member 34, the lower pancake member 38, the hinge 40, the swing arm 42, the spindle 44, and the air bag (not shown) deployed between the upper pancake member 34 and the lower pancake member 38.

Referring now to FIGS. 5 and 6, shown therein is a partial cutaway view of a second embodiment of the squatdown axle and suspension according to the present invention. An air bag 46 is mounted between a backing plate 48 and a lower bag mount 50. The backing plate 48 is secured to the frame member 36. The lower bag mount 50 is secured between axle arms 51. The lower bag mount 50 in FIGS. 5–6 performs the same function as the lower pancake plate 38 in FIGS. 3–4, i.e., the lower bag mount provides a cradle for the lower end of the air bag 46. The upper end of the air bag 46 rests against the backing plate 48. The spindle 44 attached to the swing arm 42 permits attachment of a wheel 24. The lower bag mount 50 pivots on a pivot axle 52. The pivot axle 52 is attached to the backing plate 48 which, in turn, is secured to the frame member 36. An axle bar 54 secured to both the swing arm 42 and the lower bag mount 50 extends across the width of the cargo bed 14 to a matching assembly (see FIGS. 7–8).

When the air bag 46 is progressively inflated, the lower bag mount 50 pivots on the pivot axle 52 and moves away from the backing plate 48 as depicted in FIG. 5. Limit straps (not shown) limit the movement of the cargo bed 14 relative to the spindle 44 (and, therefore, relative to the wheel 24) to the transport position in which the cargo bed 14 is parallel to the road surface. To move the cargo bed 14 to the load position, the air bag 46 is progressively deflated until the lip 28 of the tail deck portion 22 of the cargo bed 14 contacts the road surface to permit loading of cargo (See FIG. 2).

Figure 7:
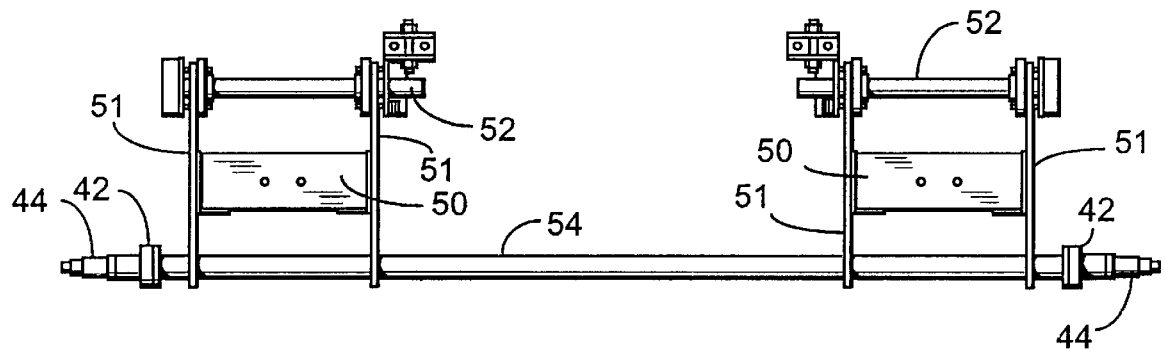
FIG. 7 is a view of an axle assembly of the second embodiment (see FIG. 5) of the suspension system of the present invention.
Figure 8:
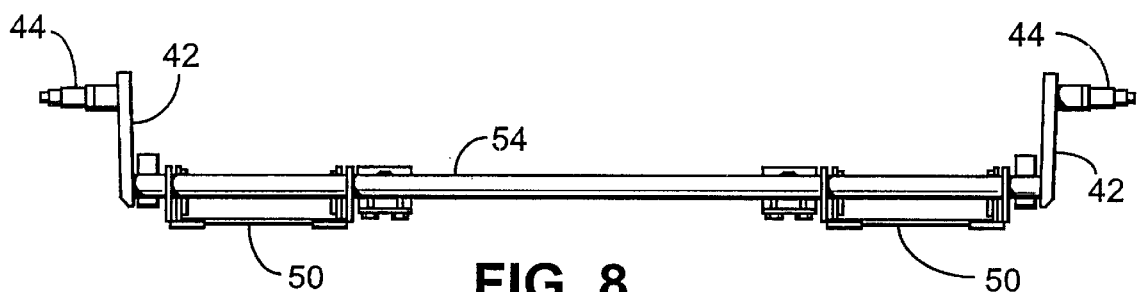
FIG. 8 is another view of the axle assembly depicted in FIG. 7.
Figure 9:
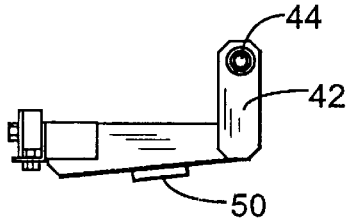
FIG. 9 is yet another view of the axle assembly depicted in FIGS. 7 and 8.

FIGS. 7–9 show additional views of the second embodiment of the squatdown axle depicted in FIGS. 5–6. The solid axle bar 54 extends between two connected assemblies, each of which assembly includes a lower bag mount 50, two axle arms 51, a swing arm 42, and a spindle 44. The lower bag mounts 50 pivot about the pivot axles 52, thereby permitting the swing arms 42 to rock upward relative to the frame member 36 and the cargo bed 14 when pressure in the air bags 46 (see FIGS. 5–6) is decreased.

Although the presently preferred embodiment employs an air bag 46 for each wheel 24, it will be understood by one skilled in the art that, in some applications, a single air bag positioned over the axle near the center of the cargo bed 14 will permit the cargo bed 14 to be adjusted between the transport position and the load position.

Figure 10:
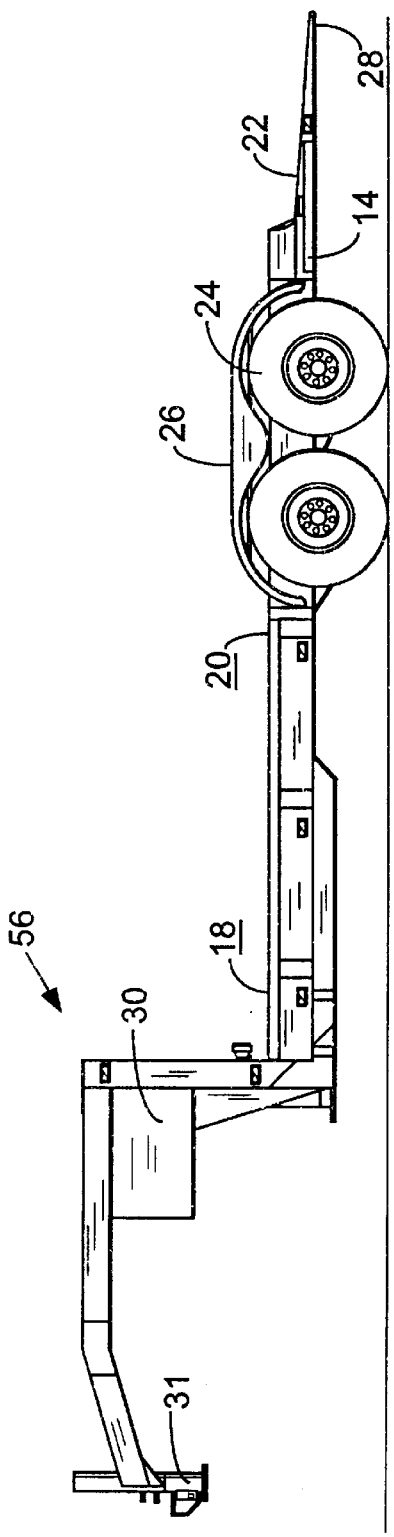
FIG. 10 is a pictorial view of a goose-neck trailer embodiment of the present invention in a transport position.
Figure 11:
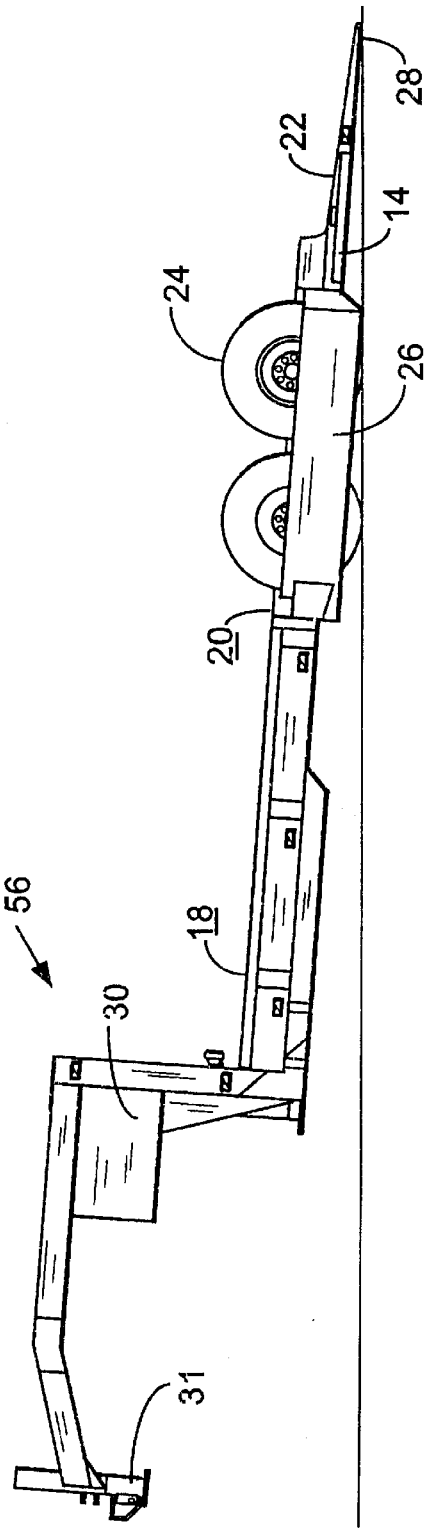
FIG. 11 is a pictorial view of the goose-neck trailer embodiment of the present invention (depicted in FIG. 10) in a load position.

Referring now to FIGS. 10–11, shown therein is a gooseneck trailer 56 according to the squatdown axle and suspension of the present invention. Either the first embodiment of the squatdown axle and suspension, as depicted in FIGS. 3–4, or the second embodiment of the squatdown axle and suspension, as depicted in FIGS. 5–9, is suitable for adaptation for use in the gooseneck trailer 56.

Referring now to FIG. 12, shown therein is a plan view of the gooseneck trailer 56 adaptation of the squatdown axle and suspension of the present invention. The gooseneck trailer 56 is equipped with a gooseneck fitting 31, and the cargo bed 14 is fitted with stake pockets 60, pulley slots 62 adapted to receive a slide-in pulley assembly 64 (see FIGS. 16–18), and a winch and cable assembly 66. Frame members 70 provide support for the cargo bed 14.

Referring now to FIG. 13, a plan view of a portion of the automobile carrier 10 depicted in FIGS. 1 and 2 illustrates frame members 70, stake pockets 60, pulley slots 62, and a winch and cable assembly 66. Extended frame members 68 permit attachment of the cargo bed 14, attached to the squatdown suspension, to a front-wheel drive truck 12 (see FIGS. 1–2).

Referring now to FIG. 1 in conjunction with FIGS. 12–13, it will be plain to one skilled in the art that the front deck portion 18 and the tail deck portion 22 of cargo bed 14 are of a width approximately equal to the maximum allowed in compliance with state and federal laws. The intermediate deck portion 20 is narrower than the front deck portion 18 and the tail deck portion 22 to accommodate the mounting of wheels 24 along each side of the intermediate deck portion 20.

Referring now to FIGS. 12–13, the stake pockets 60 permit the use of stakes (not shown) to secure cargo. The slide-in pulley assembly 64, when inserted in one of the pulley slots 62, is designed for use with the winch and cable assembly 66 to move cargo on and off of the cargo bed 14. Winches are well known in the art. According to the present invention, however, the cable and winch assembly 66 is mounted below the plane of the cargo bed 14. When in use, the cable (not shown) is positioned generally along the surface of the cargo bed 14. Because the cable stays near the surface of the cargo bed 14, the automobile carrier 10 of the present invention is especially well-suited for loading Lamborghini automobiles and other cars having as little as 2–3 inches clearance between the chassis/body and the road surface. Furthermore, the location of the cable and winch assembly 66 below the plane of the cargo bed 14 reduces the possibility of injury to operators and others.

Referring now to FIGS. 14–15, shown therein is a stock trailer 71 according to the present invention. In FIG. 14, the stock trailer 71 is shown in the transport position, while in FIG. 15, the stock trailer 71 is shown in the load position. Fenders 72 are disposed at a sufficient height above the wheels 24 such that the fenders 72 do not contact the wheels 24 during loading.

It will be understood by one skilled in the art that the squatdown axle and suspension of the present invention are also adapted for incorporation in a tag-along trailer (i.e., a trailer attached to a ball on the towing vehicle).

The wheels 24 of the embodiments depicted in FIGS. 1–15 are equipped with either hydraulically or pneumatically operated brakes. Both pneumatic and hydraulic brakes provide improved braking efficiency and safety as compared to traditional electric brakes used in most trailers.

Figure 17:
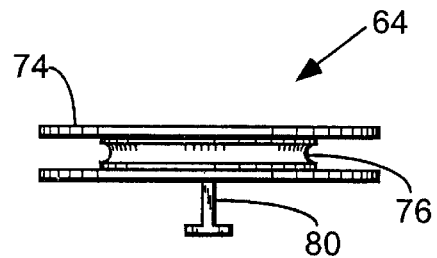
FIG. 17 is another view of the quick-insert pulley assembly depicted in FIG. 16.
Figure 16:
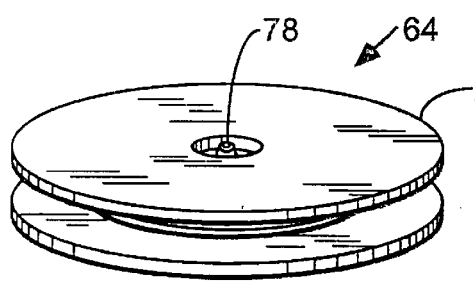
FIG. 16 is a pictorial view of a quick-insert pulley assembly used in conjunction with the present invention.
Figure 18:
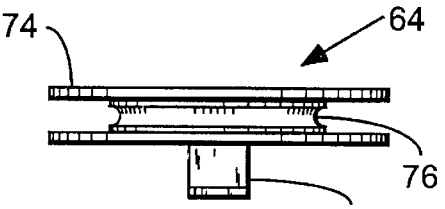
FIG. 18 is still another view of the quick-insert pulley assembly depicted in FIG. 16.

Referring now to FIGS. 16–18, shown therein is a detail of the slide-in pulley assembly 64 depicted in FIGS. 12 and 13. The slide-in pulley assembly 64 includes a housing 74 in which a pulley 76 rotates about a shaft (not shown). The shaft (not shown) is fitted with a lubrication fitting 78. A T-bar 80 attached to the housing 74 mates with the pulley slots 62 shown in FIGS. 12 and 13 to provide a pivot for use with the cable and winch assembly 66 (see FIGS. 12 and 13).

Figure 19:
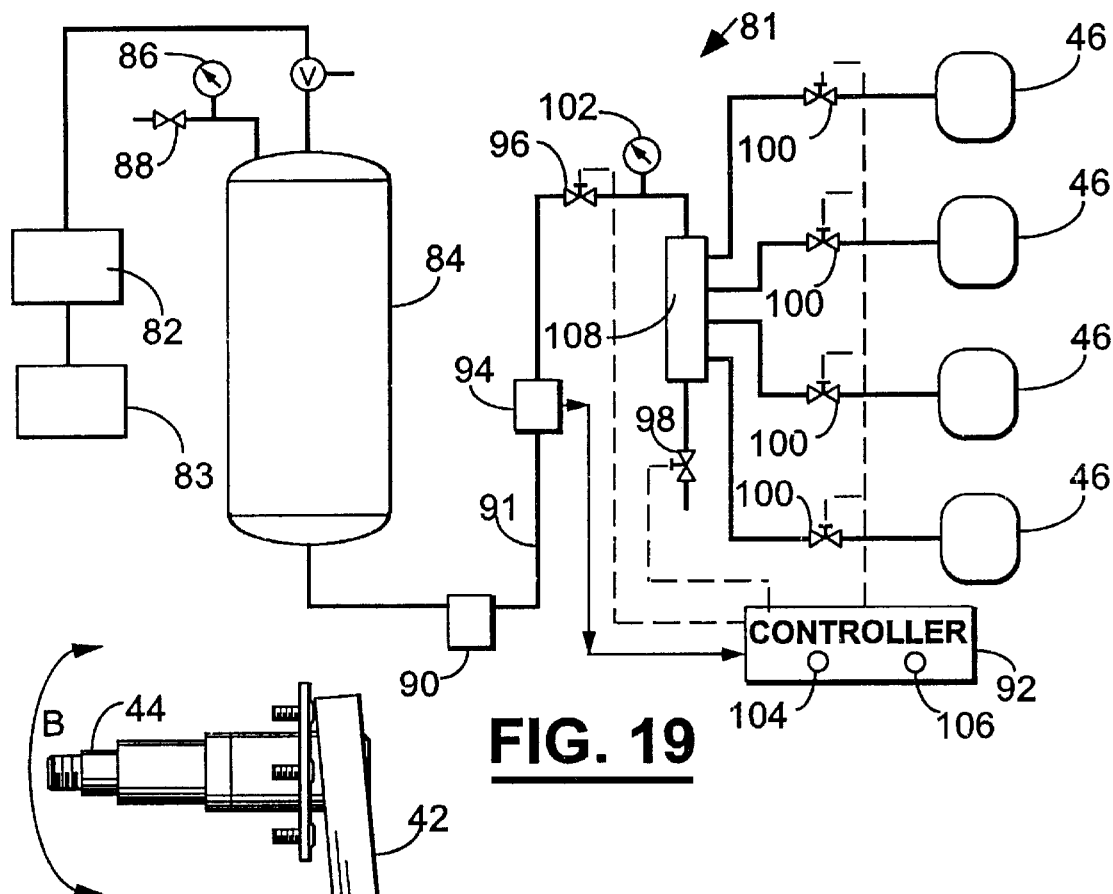
FIG. 19 is a diagram of a pneumatic system according to the present invention.

Referring now to FIG. 19, depicted therein is a pneumatic system 81. An air compressor 82, powered by an air compressor drive means 83, pressurizes a storage tank 84 equipped with a system pressure gage 86 and an auxiliary tool valve 88. A filter 90 ensures clean air is supplied to the air bags 46 (see FIGS. 3–6) through an air supply line 91. A controller 92 receives as input a signal from a pressure transducer 94 and provides output to normally-closed valves 96, 98, and 100 if either a first momentary switch 104 or a second momentary switch 106 is depressed and held in the closed position. An air bag pressure gage 102 indicates pressure on the air bags 46, and a manifold 108 distributes air from the air supply line 91, through normally-closed air valves 100, to the air bags 46. Momentary switch 104, when depressed and held in the closed position, inflates the air bags 46 by opening normally-closed air valve 96 and normally-closed air valves 100. Momentary switch 106, when depressed and held in the closed position, opens normally-closed air valves 100 and dump valve 98, thereby permitting pressure from the air bags 46 to be discharged to atmosphere through the manifold 108 and the dump valve 98.

Still referring to FIG. 19, each normally-closed valve 100 isolates its associated air bag 46 until one of the momentary switches 104, 106 is depressed. The controller 92 is equipped with logic circuitry which prohibits valves 96, 98, and 100 from being energized open unless an input is received from the pressure transducer 94 verifying that the system pressure is at least 60 PSIG.

Referring now to FIGS. 1 and 2 in conjunction with FIG. 19, the squatdown axle and suspension of the present invention are operated as follows. If the air compressor 82 has produced at least 60 PSIG air pressure downstream of the air storage tank 84, depressing and holding momentary switch 104 opens normally-closed valve 96 (in the supply line 91) and normally-closed valves 100 (downstream of the manifold 108), thereby inflating the air bags 46 and causing the cargo bed 14 to move upward to its transport position. Likewise, depressing and holding momentary switch 106 opens normally-closed air valves 100 and dump valve 98, thereby discharging air from the air bags 46 to atmosphere.

The pneumatic system 81 is an important safety feature in the squatdown axle and suspension according to the present invention. Both a minimum system pressure of 60 PSIG and a continuing affirmative act by an operator are required to move the position of the cargo bed 14 between the transport position and the load position. If the cargo bed 14 is being lowered and system pressure drops below 60 PSIG, valves 96, 98, 100 go closed on loss of power and the cargo bed 14 does not move. If the cargo bed 14 is being lowered and the operator removes his/her hand from the momentary switch, valves 96, 98, 100 go closed on loss of power and the to cargo bed 14 does not move.

Figure 20:
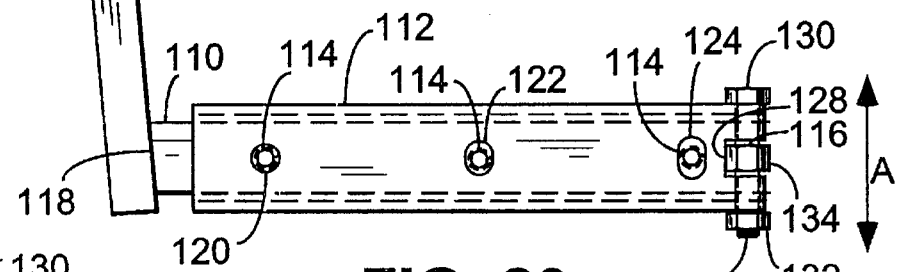
FIG. 20 is a view of an alignment assembly to align the axle and suspension depicted in FIGS. 3 and 4.
Figure 22:
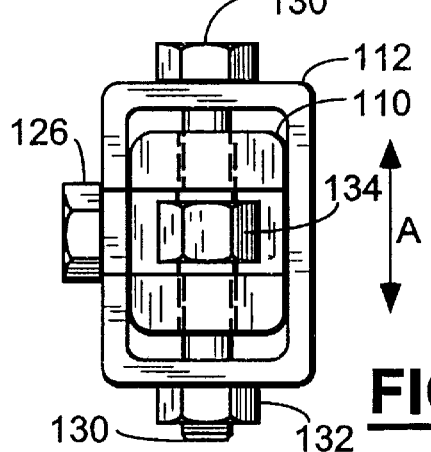
FIG. 22 is another enlarged detailed view of the portion of the alignment assembly depicted in FIG. 21.
Figure 21:
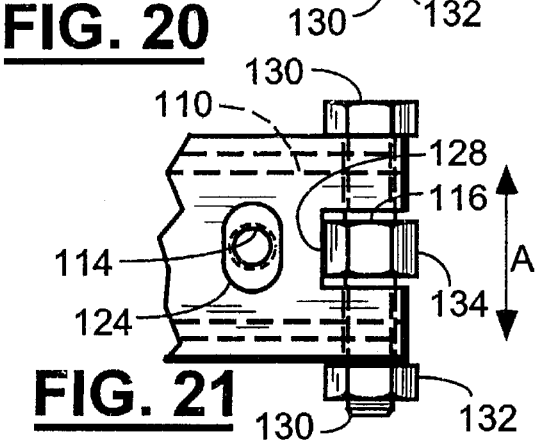
FIG. 21 is an enlarged detailed view of a portion of the alignment assembly depicted in FIG. 20.

Referring now to FIGS. 20–22 in conjunction with FIGS. 3 and 4, the spindle 44 and the swing arm 42 are supported by an axle 110. The axle 110 is disposed within an alignment tube 112. The alignment tube 112 is incorporated into the lower pancake plate 38. In FIGS. 3 and 4, the alignment tube 112, while not shown, is secured (typically by a weld) to the lower pancake plate 38, the axle 110 is loosely disposed within the alignment tube 112, and the swing arm 42 is attached to the axle 110. The axle 110 is provided with threaded bores 114 and an axle slot 116 in the end of the axle 110 distal from the weld line 118 of the swing arm 42 to the axle 110.

Still referring to FIGS. 20–22, a bore 120 in the alignment tube 112 permits insertion of a pivot bolt (not shown) through the bore 120 into the threaded bore 114. The bore 120 accommodates a snug fit of the shank of the pivot bolt (not shown). Elongated bores 122 and 124 in the alignment tube 112 permit movement of the axle 110 with respect to the alignment tube 112 along one axis when locking bolts 126 (see FIG. 22) are inserted through the elongated bores 122 and 124 into the mating threaded bores 114. An axle slot 116 mates with an alignment tube slot 128. The alignment tube slot 128 is slightly wider than the axle slot 116. An adjustment bolt 130 extending through the alignment tube 112, the axle 110, the axle slot 116, and the alignment tube slot 128 is secured by locking nut 132. An adjusting nut 134 disposed within the axle slot 116 and the alignment tube slot 128 is threaded on the adjustment bolt 130. When the adjusting nut 134 is rotated on the adjustment bolt 130, the axle 110 is forced to move within the alignment tube 112 in a direction indicated by double arrow A.

Still referring to FIGS. 20–22 in conjunction with FIGS. 3 and 4, the lower pancake plate 38, to which the alignment tube 112 is attached, is affixed to the longitudinal frame member 36. The adjusting bolt 130 carrying the adjusting nut 134 is secured in place in the alignment tube 112 by the locking nut 132. The axle 110, which carries the swing arm 42 and the spindle 44, is then inserted into the alignment tube 112. The pivot bolt (not shown) is inserted through the bore 120 into the threaded bore 114 and tightened to a snug fit. Locking bolts 126 are inserted through elongated bores 122 and 124 into threaded bores 114. The adjusting nut 134 is rotated, thereby causing the axle 110 to move within the alignment tube 112 along A. As the axle 110 moves within the alignment tube 112 along A, the spindle 44 is caused to move in a direction indicated by double-headed arrow B (FIG. 20) to achieve proper alignment. If desired, the wheel 24 can be mounted on the spindle 44 prior to alignment.

While the presently preferred embodiment of the squatdown axle and suspension of the present invention uses air bags 46 and a pneumatic system 80 to inflate or deflate the air bags 46, it will be understood by one skilled in the art that a hydraulic system could be used to move the upper pancake plate 34 and the lower pancake plate 38 between a relatively closed position (for loading) and a relative open position (for transport) (see FIGS. 3–4). Likewise, it will be understood by one skilled in the art that a hydraulic system could be used to move the lower bag mount 50 and the backing plate 48 between a relatively closed position (for loading) and a relative open position (for transport) (see FIGS. 5–9). Indeed, the squatdown axle and suspension of the present invention is adaptable to a manually operated worm drive in lieu of a pneumatic system or a hydraulic system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A squatdown suspension system for vehicles used to haul cargo, comprising:

a frame consisting of a plurality of longitudinal members and a plurality of transverse members;

at least two wheels;

a cargo bed attached to said frame, said cargo bed characterized as having a front deck portion, an intermediate deck portion, and a tail deck portion, said front deck portion and said tail deck portion each having a width approximately equal to the maximum width allowed for vehicles travelling interstate highways in the United States, said intermediate deck portion having a lesser width to permit at least one wheel to be mounted along each side of said intermediate deck portion without exceeding the maximum width for vehicles travelling interstate highways in the United States; and adjustable suspension means for suspending said cargo bed on said wheels, said suspension means adjustable between a transport position and a load position so that said cargo bed is maintained in a position generally parallel to the road surface in said transport position and said tail deck portion of said cargo bed rests on the road surface in said load position, said adjustable suspension means further comprising:

a first backing plate attached to said frame along the outside of said intermediate deck portion of said cargo bed;

a first pivot axle attached to said frame adjacent said first backing plate;

a first pair of axle arms attached to said first pivot axle;

a first lower bag mount fixed between said first pair of axle arms;

a first air bag deployed between said first backing plate and said first lower bag mount;

a second backing plate attached to said frame along said intermediate deck portion of said cargo bed on the opposite side of said frame from the location of said first backing plate;

a second pivot axle attached to said frame adjacent said second backing plate;

a second pair of axle arms attached to said second pivot axle;

a second lower bag mount fixed between said second pair of axle arms;

a second air bag deployed between said second backing plate and said second lower bag mount; and a solid axle assembly, said solid axle assembly further comprising:

an axle bar extending through said first pair of axle arms and said second pair of axle arms;

two swing arms, one said swing arm attached to each end of said axle bar; and two spindles, one said spindle attached to each said swing arm so that, as pressure within said first and second air bags is controlled from a relatively high pressure to a relatively low pressure, said first and second lower bag mounts rotate about said first and second pivot axles, respectively, thereby permitting said first and second lower bag mounts to move toward said first and second backing plates, respectively, causing said spindles to rock upward with respect to said frame and said cargo bed until said tail deck portion of said cargo bed comes to rest against the road surface; and a pneumatic system for controlling air pressure to said air bags.

2. The squatdown suspension system as recited in claim 1, wherein said adjustable suspension means for suspending said cargo bed on said wheels further comprises:

a third backing plate attached to said frame along the outside of said intermediate deck portion of said cargo bed, said third backing plate positioned in-line along said intermediate deck portion of said cargo bed with respect to said first backing plate;

a third pivot axle attached to said frame adjacent said third backing plate;

a third pair of axle arms attached to said third pivot axle;

a third lower bag mount fixed between said third pair of axle arms;

a third air bag deployed between said third backing plate and said third lower bag mount;

a fourth backing plate attached to said frame along said intermediate deck portion of said cargo bed on the opposite side of said frame from the location of said third backing plate, said fourth backing plate positioned in-line along said intermediate deck portion of said cargo bed with respect to said second backing plate;

a fourth pivot axle attached to said frame adjacent said fourth backing plate;

a fourth pair of axle arms attached to said fourth pivot axle;

a fourth lower bag mount fixed between said fourth pair of axle arms;

a fourth air bag deployed between said fourth backing plate and said fourth lower bag mount; and a solid axle assembly, said solid axle assembly further comprising:
an axle bar extending through said third pair of axle arms and said fourth pair of axle arms;
two swing arms, one said swing arm attached to each end of said axle bar; and
two spindles, one said spindle attached to each said swing arm so that, as pressure within said first, second, third, and fourth air bags is controlled from a relatively high pressure to a relatively low pressure, said first, second, third and fourth lower bag mounts rotate about said first, second, third and fourth pivot axles, respectively, thereby permitting said first, second, third, and fourth lower bag mounts to move toward said first, second, third and fourth backing plates, respectively, causing said spindles to rock upward with respect to said frame and said cargo bed until said tail deck portion of said cargo bed comes to rest against the road surface.

3. The invention as recited in claim 1, wherein said pneumatic control system further comprises:
an air compressor;
an air storage tank;
drive means for driving said air compressor;
an air supply line from said air storage tank to a manifold;
a normally-closed electrically-operated air supply valve in said air supply line;
a normally-closed electrically-operated air dump valve for venting air pressure from said manifold to atmosphere;
an air bag supply line from said manifold to each said air bag;
a normally-closed electrically-operated valve in each said air bag supply line;
pressure sensing means for sensing pressure in said air supply line;
control means for energizing said normally-closed electrically-operated supply valve, said normally-closed electrically-operated air dump valve, and said normally-closed electrically-operated valve in each said air bag supply line; and
interlock means for preventing said control means from energizing said normally-closed electrically-operated supply valve, said normally-closed electrically-operated air dump valve, and said normally-closed electrically-operated valve in each said air bag supply line unless the pressure in said air supply line exceeds a predetermined pressure.

4. A squatdown suspension system for vehicles used to haul cargo, comprising:
a frame consisting of a plurality of longitudinal members and a plurality of transverse members;
at least two wheels;
a cargo bed attached to said frame, said cargo bed characterized as having a front deck portion, an intermediate deck portion, and a tail deck portion, said front deck portion and said tail deck portion each having a width approximately equal to the maximum width allowed for vehicles travelling interstate highways in the United States, said intermediate deck portion having a lesser width to permit at least one wheel to be mounted along each side of said intermediate deck portion without exceeding the maximum width for vehicles travelling interstate highways in the United States; and
adjustable suspension means for suspending said cargo bed on said wheels, said suspension means adjustable between a transport position and a load position so that said cargo bed is maintained in a position generally parallel to the road surface in said transport position and said tail deck portion of said cargo bed rests on the road surface in said load position, said adjustable suspension means further comprising:
a first upper pancake plate attached to said frame along the outside of said intermediate deck portion of said cargo bed;
a first lower pancake plate attached by a first hinge to said first upper pancake plate;
a first swing arm rigidly attached to said first lower pancake plate;
a first spindle attached to said first swing arm;
a first wheel mounted on said first spindle; and
a first air bag deployed between said first upper pancake plate and said first lower pancake plate so that, as pressure within said first air bag is controlled from a relatively high pressure to a relatively low pressure, said first lower pancake plate collapses toward said first upper pancake plate along said first hinge and said first spindle rocks upward relative to said frame;
a second upper pancake plate;
a second lower pancake plate attached by a second hinge to said second upper pancake plate;
a second swing arm rigidly attached to said second lower pancake plate;
a second spindle attached to said second swing arm;
a second wheel mounted on said second spindle;
a second air bag deployed between said second upper pancake plate and said second lower pancake plate so that, as pressure within said second air bag is controlled from a relatively high pressure to a relatively low pressure, said second lower pancake plate moves toward said second upper pancake plate and said second spindle rocks upward relative to said frame until said tail deck portion of said cargo bed comes to rest against the road surface; and
a pneumatic system for controlling air pressure to said air bags, said pneumatic control system further comprising:
an air compressor;
an air storage tank;
drive means for driving said air compressor;
an air supply line from said air storage tank to a manifold;
a normally-closed electrically-operated air supply valve in said air supply line;
a normally-closed electrically-operated air dump valve for venting air pressure from said manifold to atmosphere;
an air bag supply line from said manifold to each said air bag;
a normally-closed electrically-operated valve in each said air bag supply line;
pressure sensing means for sensing pressure in said air supply line;
control means for energizing said normally-closed electrically-operated supply valve, said normally-closed electrically-operated air dump valve, and said normally-closed electrically-operated valve in each said air bag supply line; and
interlock means for preventing said control means from energizing said normally-closed electricallyoperated supply valve, said normally-closed electrically-operated air dump valve, and said normally-closed electricallyoperated valve in each said air bag supply line unless the pressure in said air supply line exceeds a predetermined pressure.

5. The invention as recited in claim 4, wherein said control means further comprises:

a first momentary switch so that, when said first momentary switch is maintained in the closed position, said normally-closed electrically-operated air supply valve in said air supply line and said normally-closed electrically-operated valve in each said air bag supply line are energized open, so that air from said air storage tank and said air compressor inflates said air bags; and a second momentary switch so that, when said second momentary switch is maintained in the closed position, said normally-closed electrically-operated air dump valve and said normally-closed electrically-operated valve in each said air bag supply line are energized open, so that air from said air bags is discharged to atmosphere through said manifold and said dump valve.

6. The squatdown suspension system as recited in claim 4, further comprising standard air couplings connected to said air storage tank to permit use of air tools.

7. A squatdown suspension system for vehicles used to haul cargo, comprising:

a frame consisting of a plurality of longitudinal members and a plurality of transverse members;

at least two wheels;

a cargo bed attached to said frame, said cargo bed characterized as having a front deck portion, an intermediate deck portion, and a tail deck portion, said front deck portion and said tail deck portion having a width approximately equal to the maximum width allowed for vehicles travelling interstate highways in the United States, said intermediate deck portion having a lesser width to permit at least one wheel to be mounted along each side of said intermediate deck portion without exceeding the maximum width for vehicles travelling interstate highways in the United States;

adjustable suspension means for suspending said cargo bed on said wheels, said suspension means adjustable between a transport position and a load position so that said cargo bed is maintained in a position generally parallel to the road surface in said transport position and said tail deck portion of said cargo bed rests on the road surface in said load position; and a fender covering each said wheel, each fender being a swing-out fender pivotally attach to said frame, said swing-out fender adjustable between said transport position wherein said swing-out fenders cover said wheels and said load position wherein said swing-out fenders are disposed away from said wheels to permit said wheels to move upward relative to said cargo bed when said frame and said cargo bed drop to the road surface in said load position.

8. A squatdown suspension system for vehicles used to haul cargo, comprising:

a frame consisting of a plurality of longitudinal members and a plurality of transverse members;

at least two wheels;

a cargo bed attached to said frame, said cargo bed characterized as having a front deck portion, an intermediate deck portion, and a tail deck portion, said front deck portion and said tail deck portion having a width approximately equal to the maximum width allowed for vehicles travelling interstate highways in the United States, said intermediate deck portion having a lesser width to permit at least one wheel to be mounted along each side of said intermediate deck portion without exceeding the maximum width for vehicles travelling interstate highways in the United States;

adjustable suspension means for suspending said cargo bed on said wheels, said suspension means adjustable between a transport position and a load position so that said cargo bed is maintained in a position generally parallel to the road surface in said transport position and said tail deck portion of said cargo bed rests on the road surface in said load position;

a winch mounted below said front deck portion of said cargo bid and having a cable; and a slide-in pulley assembly, said slide-in pulley assembly further comprising:

a housing;

a pulley disposed on a shaft within said housing;

a lubrication fitting communicating with said shaft through said housing; and a T-bar attached to said housing; and at least one slot disposed within said cargo bed, said slot adapted to receive said T-bar attached to said housing of said slide-in pulley assembly, so that said slide-in pulley assembly can be inserted into said slot to provide a pivot point for said cable for loading and unloading cargo from said cargo bed.

* * * * *